(12) United States Patent
Uchiyama et al.

(10) Patent No.: US 11,984,604 B2
(45) Date of Patent: *May 14, 2024

(54) LITHIUM ION BATTERY

(71) Applicant: Panasonic Intellectual Property Management Co., Ltd., Osaka (JP)

(72) Inventors: Yohei Uchiyama, Hyogo (JP); Taisuke Yamamoto, Nara (JP); Tatsuya Akira, Osaka (JP); Norihisa Yamamoto, Osaka (JP); Hiroshi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 388 days.

This patent is subject to a terminal disclaimer.

(21) Appl. No.: 16/767,774

(22) PCT Filed: Oct. 26, 2018

(86) PCT No.: PCT/JP2018/039809
§ 371 (c)(1),
(2) Date: May 28, 2020

(87) PCT Pub. No.: WO2019/107033
PCT Pub. Date: Jun. 6, 2019

(65) Prior Publication Data
US 2020/0350591 A1 Nov. 5, 2020

(30) Foreign Application Priority Data
Nov. 29, 2017 (JP) .................. 2017-229468

(51) Int. Cl.
*H01M 4/66* (2006.01)
*H01M 4/02* (2006.01)
(Continued)

(52) U.S. Cl.
CPC .......... *H01M 4/661* (2013.01); *H01M 4/131* (2013.01); *H01M 4/386* (2013.01); *H01M 4/583* (2013.01);
(Continued)

(58) Field of Classification Search
CPC ...... H01M 4/661; H01M 4/131; H01M 4/386; H01M 4/583; H01M 4/622;
(Continued)

(56) References Cited

U.S. PATENT DOCUMENTS

2014/0370378 A1* 12/2014 Liu ................. H01M 4/1395
427/213.36
2015/0303456 A1  10/2015 Yoo et al.
(Continued)

FOREIGN PATENT DOCUMENTS

CN      103779574 A      5/2014
CN      107408682 A      11/2017
(Continued)

OTHER PUBLICATIONS

International Search Report dated Jan. 29, 2019, issued in counterpart application No. PCT/JP2018/039809, with English translation. (4 pages).

(Continued)

*Primary Examiner* — Brian R Ohara
*Assistant Examiner* — Emily Elizabeth Freeman
(74) *Attorney, Agent, or Firm* — WHDA, LLP

(57) ABSTRACT

A lithium ion battery including a negative electrode having a negative electrode active material layer that contains lithium silicate particles and a binder. The lithium silicate particles include composite particles including a lithium silicate phase and silicon particles dispersed in the lithium silicate phase, wherein a carbon material is present inside the composite particles, and an area ratio of the carbon material (Continued)

occupying a cross section of the composite particles is 0.008 to 6%. The binder includes at least a first resin, wherein the first resin is at least cue selected from the group consisting of polyacrylic acid, a polyacrylic acid salt, and their derivatives. The first resin is contained in an amount of 2 mass % or less in the negative electrode active material layer.

8 Claims, 2 Drawing Sheets

(51) Int. Cl.
  *H01M 4/131* (2010.01)
  *H01M 4/38* (2006.01)
  *H01M 4/583* (2010.01)
  *H01M 4/62* (2006.01)
  *H01M 10/0525* (2010.01)

(52) U.S. Cl.
  CPC ....... *H01M 4/622* (2013.01); *H01M 10/0525* (2013.01); *H01M 2004/021* (2013.01); *H01M 2004/027* (2013.01); *H01M 2004/028* (2013.01)

(58) Field of Classification Search
  CPC ....... H01M 10/0525; H01M 2004/021; H01M 2004/027; H01M 2004/028; H01M 4/58; H01M 4/362
  See application file for complete search history.

(56) References Cited

U.S. PATENT DOCUMENTS

| | | |
|---|---|---|
| 2017/0149050 A1 | 5/2017 | Hirose et al. |
| 2017/0179469 A1* | 6/2017 | Jiang ................. H01M 10/0525 |
| 2017/0309950 A1 | 10/2017 | Minami et al. |
| 2017/0324083 A1 | 11/2017 | Yamamoto et al. |
| 2018/0342757 A1* | 11/2018 | Choi ..................... H01M 4/583 |
| 2020/0091500 A1 | 3/2020 | Nishitani et al. |

FOREIGN PATENT DOCUMENTS

| | | | |
|---|---|---|---|
| JP | 2011-76793 A | 4/2011 | |
| JP | 2013-125648 A | 6/2013 | |
| JP | 2014-051418 A | 3/2014 | |
| JP | 2014-80319 A | 5/2014 | |
| JP | 2014-82219 A | 5/2014 | |
| JP | 2014-107013 A | 6/2014 | |
| JP | 2015-153520 A | 8/2015 | |
| WO | 2015/198511 A1 | 12/2015 | |
| WO | WO-2016121325 A1 * | 8/2016 | ............. H01M 4/13 |
| WO | 2018/123751 A1 | 7/2018 | |

OTHER PUBLICATIONS

Extended Search Report dated Nov. 20, 2020, issued in counterpart EP Application No. 18884035.9. (10 pages).

English Translation of Chinese Search Report dated Sep. 5, 2022, issued in counterpart CN Application No. 201880074569.9. (3 pages).

* cited by examiner

LITHIUM ION BATTERY

TECHNICAL FIELD

The present invention mainly relates to an improvement of a negative electrode for a lithium ion battery.

BACKGROUND ART

In recent years, there has been a growing expectation for lithium ion batteries having a high voltage and a high energy density, as a promising power source for small consumer applications, power storage devices, and electric vehicles. With increasing demand for a higher battery energy density, a material containing silicon (Si) that forms an alloy with lithium has been expected to be utilized as a negative electrode active material having a high theoretical capacity density.

A material containing silicon, however, has a large irreversible capacity, and thus is inferior in initial charge-discharge efficiency (esp., ratio of first discharge capacity to first charge capacity). To address this, various techniques have been proposed for introducing lithium in an amount corresponding to the irreversible capacity in advance, into a material containing silicon. Specifically, one proposal suggests using composite particles including a lithium silicate phase and silicon particles dispensed in the lithium silicate phase (Patent Literature 1). The silicon particles contribute to charge and discharge reactions (reversible absorption and release of lithium).

CITATION LIST

Patent Literature

[PTL1] Japanese Laid-Open Patent Publication No. 2015-153520

SUMMARY OF INVENTION

The silicon particles, however, expand and contract considerably in association with absorption and release of lithium, during charge and discharge. As the silicon particles expand and contract, a large stress is generated in the lithium silicate phase present around the silicon particles, causing cracks or breaks in the composite particles. In association with this, the bonding face between the composite particles and a binder therearound is weakened, and especially when broken, the composite particle loses an electrical communication path with the neighboring particles, and becomes isolated. This deteriorates the charge-discharge cycle characteristics.

In view of the above, one aspect of the present invention relates to a lithium ion battery including a positive electrode, a negative electrode, and an electrolyte, the negative electrode having a current collector, and a negative electrode active material layer disposed on the current collector and containing lithium silicate particles and a binder. The lithium silicate particles include composite particles including a lithium silicate phase and silicon particles dispersed in the lithium silicate phase, wherein a carbon material is present inside the composite particles, and an area ratio of the carbon material occupying a cross section of the composite particles is 0.008 to 6%. The binder includes at least a first resin, wherein the first resin is at least one selected from the group consisting of polyacrylic acid, a polyacrylic acid salt, and their derivatives. The first resin is contained in an amount of 2 mass % or less in the negative electrode active material layer.

According to the present invention, a lithium ion battery having excellent charge-discharge cycle characteristics can be provided.

DESCRIPTION OF EMBODIMENTS

Figure 1:
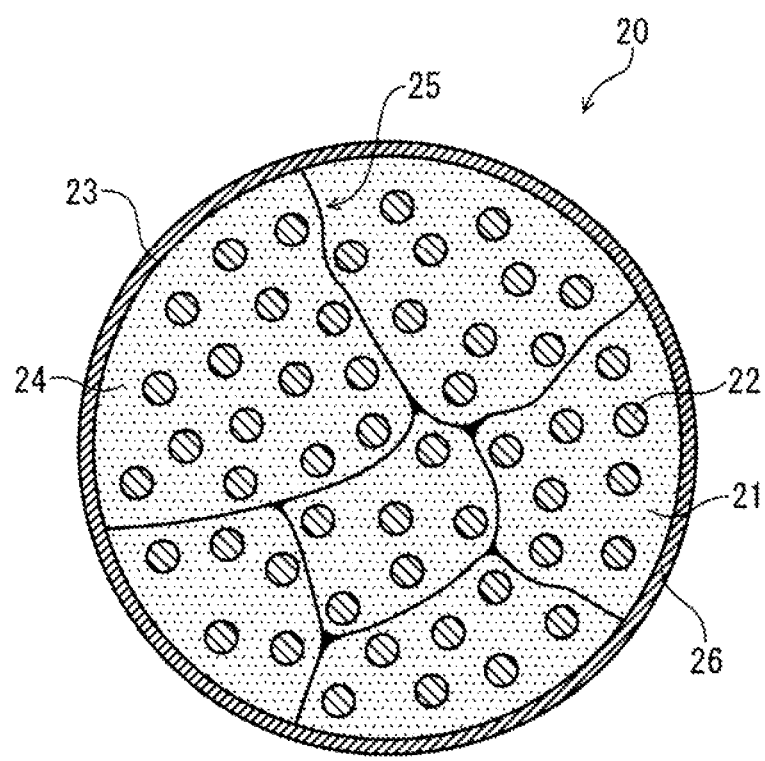
FIG. 1 A schematic cross-sectional view of a negative electrode material according to an embodiment of the present invention.

A lithium ion battery according to au embodiment of the present invention includes a positive electrode, a negative electrode, and an electrolyte, in which the negative electrode includes a negative electrode active material layer containing a negative electrode material and a binder. The negative electrode material (hereinafter, sometimes referred to as LSX particles) comprises composite particles each including a lithium silicate phase and silicon particles dispersed in the lithium silicate phase. The silicon particles have a particulate phase of simple silicon (Si). A carbon material is present inside the composite particles, and an area ratio of the carbon material occupying a cross section of the composite particles is 0.008 to 6%. The binder includes at least a first resin. The first resin is at least one selected from the group consisting of polyacrylic acid a polyacrylic acid salt, and their derivatives. The first resin is contained in an amount of 2 mass % or less in the negative electrode active material layer.

The presence of a carbon material in a specific ratio inside the composite particles can reduce the stress generated in the lithium silicate phase doe to expansion and contraction of the silicon particles during charge and discharge. Furthermore, when the negative electrode active material layer contains a first resin in an amount of 2 mass % or less, the bending force between the composite particles and the binder therearound is increased, and the isolation of the composite particle due to expansion and contraction can be suppressed. In this way, the occurrence of cracks and breaks in the composite particles due to repeated charge and discharge can be sufficiently suppressed, resulting in improved charge-discharge cycle characteristics.

The carbon material may be present within the lithium silicate phase or between the lithium silicate phase and the silicon particles. The carbon material may be distributed in dots or linearly on a cross section of the composite particles.

When the area ratio of the carbon material occupying a cross section of the composite particles is 0.008 to 6%, a lithium ion battery having a high capacity and excellent chaise-discharge cycle characteristics can be provided. When the area ratio of the carbon material occupying a cross section of the composite particles is less than 0.008%, the occurrence of cracks and breaks in the composite particles is difficult to be suppressed and the charge-discharge cycle characteristics deteriorate. When the area ratio of the carbon material occupying a cross section of the composite particles exceeds 6%, the presence ratio of the silicon particles that contribute to the charge and discharge is reduced, and the battery capacity decreases.

In order to further enhance the battery capacity and the charge-discharge cycle characteristics, the area ratio of the carbon material occupying a cross section of the composite particles is preferably 0.5 to 6%, more preferably 1 to 3%.

The area ratio of the carbon material occupying a cross section of the composite particles can be determined, for example, as follows. First, the battery is disassembled, to take out the negative electrode, which is then polished with a cross section polisher (CP), to obtain a cross section of the negative electrode mixture layer. The cross section of the negative electrode mixture layer is observed under a seaming electron microscope (SEM). From a cross-sectional image of the negative electrode mixture layer, 10 LSX particles having a maximum diameter of 5 μm or more are randomly selected, which are then each subjected to a carbon mapping analysis by an energy dispersive X-ray (EDX). The obtained measured values of the 10 particles are averaged.

It is to be noted that a film that coats the LSX particles may be formed in the course of charge and discharge due to, for example, the decomposition of the electrolyte. In addition, as described later, the LSX particles sometimes further include an electrically conductive layer covering the surface of the composite particles. With these taken into account, the EDX mapping analysis is performed within 1 μm inward from the peripheral edge of the cross section of the LSX particles, so that neither the thin coating film nor the conductive layer enters the measurement area. By the EDX mapping analysis, the distributed state of the carbon material inside the composite particles can also be checked.

The carbon material preferably contains at least one selected from the group consisting of a carbon compound and a carbonaceous material. Preferred is a carbonaceous material.

Examples of the carbon compound include a compound containing carbon and hydrogen, and a compound containing carbon, hydrogen, and oxygen.

Examples of the carbonaceous material include an amorphous carbon having low crystallinity, such as carbon black, coal, coke, charcoal, and activated carbon, and graphite having high crystallinity. Preferred is an amorphous carbon in terms of its low hardness and excellent buffering effect against the silicon particles whose volume changes during charge and discharge. The amorphous carbon may be graphitizable carbon (soft carbon) or non-graphitizable carbon (hard carbon). Examples of the carbon black include acetylene black and Ketjen Mack. The graphite means a material having a graphite-like crystal structure, examples of which include natural graphite, artificial graphite, and graphitized mesophase carbon particles.

In the lithium silicate phase, there are not so many sites that can react with lithium, and a new irreversible reaction hardly occurs Airing charge and discharge. Therefore, excellent charge-discharge efficiency is exhibited in the initial stage of charge and discharge.

In view of the chemical stability and lithium ion conductivity, the lithium silicate phase preferably has a composition represented by a formula: $Li_{2x}SiO_{(2+x)}$, where $0<x<2$. This means that the composition of the lithium silicate phase does not include $Li_4SiO_4$ (x=2). $Li_4SiO_4$ is chemically unstable and, when reacting with water, readily elutes an alkaline component therefrom. This may cause inconveniences during production of the negative electrode, or deterioration of the negative electrode.

In view of further improving the chemical stability of the lithium silicate phase, more preferably $x \leq \frac{1}{2}$. Further more preferably, $\frac{1}{4} \leq x \leq \frac{1}{2}$.

The negative electrode material (LSX particles) preferably further includes an electrically conductive material that covers at least part of a surface of the composite particles. The lithium silicate phase is poor in electron conductivity, and dais the composite particles also tend to be low in electrical conductivity. However, by covering the composite particles with an electrically conductive material, the electrical conductivity can be considerably enhanced.

The conductive layer formed on the surface of the composite particles with coating of an electrically conductive material is preferably dun enough not to substantially influence the average diameter of the composite particles. The conductive layer has a thickness of preferably 1 to 200 ran, more preferably 5 to 100 nm, for securing the electrical conductivity and allowing for diffusion of lithium ions. The thickness of the conductive layer can be measured by cross-section observation of the particles using a SEM or TEM.

Next, a detailed description will be given of a method of producing a negative electrode material.

Step (i)

A raw material of lithium silicate that can be used is a mixture of silicon dioxide and lithium compound. By sintering the mixture, a lithium silicate having a predetermined composition ratio can be obtained. For example, when the raw material is formulated so as to have a Si/Li atomic ratio of 1, $Li_2Si_2O_5$ can be obtained.

Examples of the lithium compound include lithium carbonate, lithium oxide, lithium hydroxide, and lithium hydride. These may be used singly or in combination of two or more kinds.

The mixture of silicon dioxide and lithium compound is preferably heated, in the air, at 400° C. to 1200° C., preferably at 800° C. to 1100° C., to allow the silicon dioxide to react with the lithium compound.

Step (ii)

Next, a raw material silicon is blended into the lithium silicate, to firm a composite thereof. For example, composite particles are formed through the following processes (a) to (c).

Process (a)

First, raw material silicon powder and lithium silicate powder are mixed in a HBSS ratio of fix example, 20:80 to 95:5. The raw material silicon may be coarse particles of silicon having an average diameter of about several μm to several tens μm.

Process (b)

Next, the mixture of raw material silicon and lithium silicate is stirred while being pulverized into fine particles, using a pulverizer like a ball mill. At tins time, it is preferable to add an organic solvent to the mixture and perform wet pulverization. A predetermined amount of the organic solvent may be fed all at once into a pulverizer vessel at the beginning of the pulverization, or may be fed dividedly in a plurality of times into the vessel in the course of pulverization. The organic solvent serves to prevent an object to be pulverized from adhering onto the inner wall of the vessel, and also serves as a raw material of the carbon material to be allowed to be present within the composite particles.

Examples of the organic solvent include alcohols, ethers, fatty adds, alkanes, cycloalkanes, silicate esters, and metal alkoxides. The alcohols may be primary, secondary or tertiary alcohols. Examples of the alcohols include methanol, ethanol, butanol, isopropyl alcohol, ethylene glycol, glycerin, octanol, lauryl alcohol myristyl alcohol, cetyl alcohol, stearyl alcohol oleyl alcohol, and linolyl alcohol Examples of the ethers include diethyl ether.

The fatty acids may be saturated or unsaturated fatty acids. Examples of the tatty acids include butanoic acid, pentanoic acid, hexanoic acid, heptanoic acid, octanoic acid, nonanoic acid, decanoic acid, dodecanoic acid, tridecanoic acid, tetradecanoic acid, pentadecanoic acid, hexadecanoic acid, heptadecanoic acid, octadecanoic acid, nonadecane, and icosanoic acid.

Examples of the alkanes include methane, ethane, butane, pentane, hexane, heptane, octane, nonane, decane, undecane, dodecane, tridecane, tetradecane, pentadecane, hexadecane, heptadecane, octadecane, nonadecane, and icosane. Examines of the cycloalkanes include cyclopentane, cyclohexane, cycloheptane, cyclooctane, cyclononane, cyclodecane, cycloundecane, cyclododecane, cyclotridecane, cyclotetradecane, cyclopentadecane, cyclohexadecane, cycloheptadecaue, cyclooctadecane, cyclononadecane, and cyckacosane. Examples of the silicate esters include ethyl orthosilicate and methyl orthosilicate. Examples of the metal alkoxides include methyltrimethoxysilane. These organic solvents may be used singly, or in combination of two or more kinds.

When no organic solvent is used, a mixture of raw material silicon powder, lithium silicate powder, and carbon material powder may be fed into the pulverizer vessel.

Note that the raw material silicon and the lithium silicate may be mixed after pulverized separately into fine particles. Also, silicon nanoparticles, lithium silicate nanoparticles, and carbon nanoparticles may be each prepared without using a pulverizer, and mixed together. These nanoparticles can be prepared by any known method, such as a gas phase method (e.g., plasma method) or a liquid phase method (e.g., liquid phase reduction method).

Process (c)

Next the mixture pulverized into fine particles are heated, for example, at 450° C. to 1000° C. in an inert atmosphere (e.g., argon or nitrogen atmosphere) to be sintered. In this way, composite particles including a lithium silicate phase and silicon particles dispersed in the lithium silicate phase may be obtained.

In the beating above, foe mixture (primary particles) may be healed wink applying pressure thereto (while forcing the primary particles to aggregate) by a hot press or the like, thereby to produce a sintered body of the mixture. The obtained sintered body is composed of an aggregate of a plurality of primary particles including a lithium silicate phase and silicon particles dispersed in the lithium silicate phase.

Lithium silicate is stable at 450° C. to 1000° C. and hardly reacts with silicon. Therefore, a capacity decrease is, if any, very small.

The sintered body (aggregate of primary particles) is then crushed lentil it becomes granules, which can be used as composite particles (secondary particles). At this time, by selecting the crashing conditions as appropriate, secondary particles having a predetermined average diameter can be obtained. The average diameter of the secondary particles is, for example, 1 to 20 μm. The average diameter of the secondary particles means a particle diameter (volume average particle diameter) at 50% cumulative volume in a particle size distribution measured by a laser diffraction/scattering method.

When, in the process (b), an organic solvent is added to the mixture when pulverized into fine particles, the finely pulverized mixture contains the organic solvent. In the course of pulverization, the organic solvent is likely to change due to rise in temperature by the collision energy of fine particles generated in association with pulverization, and is likely to be chemically bonded to fine particles and localized on the surfaces of the fine particles. Therefore, within the obtained secondary particles (sintered pieces), a carbon material (e.g., amorphous carbon) derived from the organic solvent tends to be formed like a network along the surfaces of the primary particles (fine particles). Depending cm the timing of addition of the organic solvent and other conditions, the carbon material derived from the organic solvent is possibly formed within the primary particles, too. By changing the amount of the organic solvent to be added, the area ratio of the carbon material occupying the composite particles can be controlled.

Step (iii)

Next at least part of the surface of the composite particles (secondary particles) may be coated with an electrically conductive material, to form an electrically conductive layer thereon. The conductive material is preferably electrochemically stable, and is preferably an electrically conductive carbon material. Examples of the method of coating the composite particles with the conductive carbon material include: a CVD method using a hydrocarbon gas, such as acetylene or methane, as a raw material; and a method of mixing coal pitch, petroleum pitch, phenol resin or the like with the composite particles, followed by beating and carbonizing. In another method, carbon blade may be attached to the surface of the composite particles.

Step (iv)

The production method may include a step of washing the composite particles (including the case where the conductive layer is finned on the surface) with an acid. For example, washing the composite particles with an acidic aqueous solution can dissolve and remove a small amount of alkali component, which may have produced during the formation of a composite of the raw material silicon and the lithium silicate, from the surface of the composite particles. Examples of the acidic aqueous solution include an aqueous solution of an inorganic acid such as hydrochloric acid, hydrofluoric acid, sulfuric acid, nitric acid, phosphoric acid, or carbonic acid, and an aqueous solution of an organic acid, such as citric acid or acetic acid.

FIG. 1 is a schematic cross-sectional view of one of LXS particles 20, which is one example of the negative electrode.

The LXS particle 20 includes a base particle 23 comprising a secondary particle formed of a plurality of primary particles 24 aggregated together. The base particle 23 (or primary particle 24) includes a lithium silicate phase 21 and silicon particles 22 dispersed in the lithium silicate phase 21.

As illustrated in FIG. 1, a carbon material 25 is preferably present, inside the base particle 23, at at least part of the interface between the primary particles 24 adjacent to each other. Although net shown, the carbon material may be present also inside the primary particles 24 (e.g., inside the lithium silicate phase 21 or between the lithium silicate phase 21 and the silicon particles 22).

As illustrated in FIG. 1, the LSX particle 20 preferably further includes an electrically conductive material (conductive layer 26) covering at least part of the surface of the base particle 23. In tins case, as illustrated in FIG. 1, the carbon material 25 is preferably present so as to extend linearly from the interior toward the surface of the base particle 23, along the interface between the primary particles 24 adjacent to each other, and an end of the carbon material 25 on the surface side of the base particle 23 is preferably in contact with the conductive material (conductive layer 26). The carbon material 25 and the conductive material (conductive layer 26) form a favorable conductive network from the surface to the interior of the base particle 23, which can further improve the battery capacity and the charge-discharge cycle characteristics.

The silicon particles 22 are preferably substantially uniformly dispersed within the lithium silicate phase 21. The base particle 23 (primary particle 24) has, for example, a sea-island structure in which fine silicon particles are dispersed in a matrix of the lithium silicate phase 21. In this case, in an arbitrary cross section of the base particle 23 (primary particle 24), the silicon particles 22 (simple Si) are substantially evenly scattered, without being localized in some regions.

The lithium silicate phase 21 and the silicon particle 22 both preferably comprise an assembly of microfine particles. The lithium silicate phase 21 is preferably composed of finer particles than those composing the silicon particle 22. In this case, the negative electrode material LSX 20 has an X-ray diffraction (XRD) pattern in which the diffraction peak intensity attributed to the (111) plane of simple Si is higher than that attributed to the (111) plane of the lithium silicate.

The base particle 23 may include other components, in addition to the lithium silicate phase 21, the silicon particles 22, and the carbon material. For example, the lithium silicate phase 21 may contain a small amount of crystalline or amorphous $SiO_2$, in addition to lithium silicate. The amount of $SiO_2$ in the base particles 23 as measured by Si-NMR is, for example, preferably 30 mass % or less, more preferably less than 7 mass %.

The amount of the silicon particles 22 (simple Si) occupying the base particles 23 as measured by Si-NMR is preferably 20 mass % to 95 mass %, more preferably 35 mass % to 75 mass % in view of achieving a higher capacity and improving the cycle characteristics. In this case, a high charge-discharge capacity can be ensued, and lithium ions can diffuse smoothly, tending to lead to excellent load characteristics. In addition, the surfaces of the silicon particles that come in contact with the electrolyte by being exposed without being covered with the lithium silicate phase can be reduced, and thereby, the deterioration of the cycle characteristics can be suppressed.

In view of the chemical stability, ease of production, and lithium ion conductivity, the lithium silicate phase 21 is preferably mainly composed of at least one of $Li_2Si_2O_5$ (x=½) and $Li_2SiO_3$ (x=1) and more preferably mainly composed of $Li_2Si_2O_5$. The lithium silicate phase 21 may contain, in addition to the above main component, a small amount of another phase, such as $Li_2Si_3O_7$, $Li_2Si_4O_9$, $Li_2Si_5O_{11}$, $Li_2Si_6O_{13}$, $Li_2Si_7O_{15}$, $Li_2Si_8O_{17}$, $Li_2Si_9O_{19}$, and $Li_2Si_{10}O_{21}$.

The amount of the above main component in the lithium silicate phase 21 as measured by Si-NMR is preferably 50 mass % or more, more preferably 80 mass % or more. In this case, the elution of an alkali component from the lithium silicate phase can be suppressed, and inconveniences such as the deterioration of the negative electrode by the alkali component can be prevented Desirable Si-NMR measurement conditions are as below.

<Si-NMR Measurement Condition>
Measuring apparatus: solid nuclear magnetic resonance spectrometer (INOVA-400), available from Varian. Inc.
Probe: Varian 7 mm CPMAS-2
MAS: 4.2 kHz
MAS speed: 4 kHz
Pulse: DD (45° pulse+signal capture time 1H decoupling)
Repetition time: 1200 sec
Observation width: 100 kHz
Observation center: around −100 ppm
Signal capture time: 0.05 sec
Number of times of accumulation: 560
Sample amount: 207.6 mg The primary particles 24 have an average diameter of preferably 0.2 to 10 μm, more preferably 2 to 8 μm. In this case, the stress due to changes in volume of the negative electrode material Airing charge and discharge tends to be further reduced, and excellent cycle characteristics tend to be obtained. In addition, since the composite particles can have an appropriate surface area, the decrease in capacity due to a side reaction with the electrolyte cm be suppressed.

The average diameter of the primary particles 24 can be measured by observing a cross section of the negative electrode material using a SEM. Specifically, with respect to randomly selected 100 primary particles 24, the diameter of an equivalent circle (a circle having the same area as the cross-sectional area of the primary particle) of the cross section of each particle is measured, and the measured values are averaged.

The average diameter of the silicon particles 22 is, before the first charge, 500 nm or less, preferably 200 nm or less, more preferably 50 nm or less. The silicon particles 22 moderately pulverized as above undergo less changes in volume during charge and discharge, and exhibit improved structural stability. The average diameter of the silicon particles 22 can be measured by observing a cross section of the negative electrode material using a SEM or TEM Specifically, with respect to randomly selected 100 silicon particles 22, the maximum diameter is measured, and the measured values are averaged.

A lithium ion battery according to an embodiment of the presort invention includes a negative electrode including the above-described negative electrode material, a positive electrode, and an electrolyte. Description will be given below of the negative electrode, the positive electrode, and the electrolyte.

[Negative Electrode]

The negative electrode includes, for example, a negative electrode current collector, and a negative electrode mixture layer formed on a surface of the negative electrode current collector and containing a negative electrode active material. The negative electrode mixture layer can be formed by applying a negative electrode slurry comprising a negative electrode mixture dispersed in a dispersion medium, onto a surface of the negative electrode current collector, and drying the stony. The dry applied film may be rolled if necessary. The negative electrode mixture layer may be formed on one surface or both surfaces of the negative electrode current collector.

The negative electrode mixture includes, as an essential component, the above-described negative electrode material that serves as the negative electrode active material, and may include a binder, an electrically conductive agent a thickener, and other optional components. The silicon particles in the negative electrode material can absorb many lithium ions, and therefore, can contribute to increase the capacity of the negative electrode.

The negative electrode active material preferably further includes a carbon-based active material that electrochemically absorbs and releases lithium ions. The negative electrode material expands and contracts in volume in association with charge and discharge. Therefore, increasing the ratio thereof in the negative electrode active material may cause a contact failure, in association with charge and discharge, between the negative electrode active material and the negative electrode current collector. However, by using the negative electrode material and a carbon-based active material in combination, excellent cycle characteristics can be achieved, while a high capacity of the silicon particles can be imparted to the negative electrode. The ratio of the negative electrode material to the total of the negative electrode material and the carbon-based active material is preferably, for example, 3 to 30 mass %. In this case, a higher capacity as well as improved cycle characteristics tend to be achieved.

Examples of the carbon-based active material include graphite, graphitizable carbon (soft carbon), and non-graphitizable carbon (hard carbon). Preferred among them is graphite, which is stable during charge and discharge and whose irreversible capacity is small. The graphite means a material having a graphite-tike crystal structure, examples of which include natural graphite, artificial graphite, and graphitized mesophase carbon particles. The carbon-based material may be used singly or in combination of two or mere kinds.

Examples of the negative electrode current collector include a non-porous electrically conductive substrate (e.g., metal foil) and a porous electrically conductive substrate (e.g., mesh, net, punched sheet). The negative electrode current collector may be made of for example, stainless steel, nickel, a nickel alloy, copper, or a copper alloy. The negative electrode current collector may have any thickness. In view of balancing between maintaining the strength and reducing the weight of the negative electrode, the thickness is preferably 1 to 50 μm, more preferably 5 to 20 μm.

The binder includes at least a first resin. The first resin is at least one selected from the group consisting of polyacrylic acid, a polyacrylic acid salt, and their derivatives. A preferred polyacrylic acid salt is a Li or Na salt. Particularly preferred is a cross-linked polyacrylic acid lithium. Examples of the derivatives include an ester of polyacrylic acid, such as polymethyl acrylate.

The amount of the first resin in the negative electrode active material layer is 2 mass % or less, preferably 0.2 mass % or more and 2 mass % or less.

The first resin may be used in combination with a second resin. Examples of the second resin include: fluorocarbon resin, such as polytetrafluoroethylene and polyvinylidene fluoride (PVDF); polyolefin resin, such as polyethylene and polypropylene; polyamide resin, such as aramid resin; polyimide resin, such as polyimide and polyamide-imide; vinyl resin, such as polyvinyl acetate; polyvinyl pyrrolidone; polyether sulfone; and a rubbery material, such as styrene-butadiene copolymer rubber (SBR). These may be used singly or in combination of two or more kinds. The second resin may be an acrylic resin other than the first resin. Examples of the acrylic resin other than the first resin include ethylene-acrylic acid copolymers, polyacrylonitrile, polymethacrylic acid, polymethacrylic acid salts, and their derivatives.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more kinds.

Examples of the thickener include: carboxymethyl cellulose (CMC) and modified products thereof (including salts, such as Na salt); cellulose derivatives (e.g., cellulose ethers), such as methyl cellulose; saponificated products of a polymer having a vinyl acetate unit, such as polyvinyl alcohol; polyethers (e.g., polyalkylene oxide, such as polyethylene oxide). These may be used singly or in combination of two or more kinds.

Examples of the dispersion medium include; water; alcohols, such as ethanol; ethers, such as tetrahydrofuran; amides, such as dimethylformamide; N-methy-2-pyrrolidone (NMP); and a mixed solvent of these.

[Positive Electrode]

The positive electrode includes, fir example, a positive electrode current collector; and a positive electrode mixture layer formed on a surface of the positive electrode current collector. The positive electrode mixture layer can be formed by applying a positive electrode slurry of a positive electrode mixture in a dispersion medium, onto a surface of the positive electrode current collector, and drying the slurry. The dry applied film may be reeled, if necessary. The positive electrode mixture layer may be formed an one surface or both surfaces of the positive electrode current collector.

The positive electrode mixture includes, as au essential component, a positive electrode active material, and may include a tinder, an electrically conductive agent, and other optional components.

The positive electrode active material may be a lithium composite metal oxide. Examples of the lithium composite metal oxide include $Li_aCoO_2$, $Li_aNiO_2$, $Li_aMnO_2$, $Li_aCo_bNi_{1-b}O_2$, $Li_aCo_bM_{1-b}O_c$, $Li_aN_{1-b}M_bO_c$, $Li_aMn_2O_4$, $Li_aMn_{2-b}M_bO_4$, $LiMePO_4$, and $Li_2MePO_4F$. Here. M represents at least one selected from Na, Mg, Sc, Y, Mn, Fe, Co, Ni, Cu, Zn, Al, Cr, Pb, Sb and B. Me includes at feast one transition element (e.g., at least one selected from the group consisting of Mn, Fe, Co and Ni), a=0 to 1.2, b=0 to 0.9, and c=2.0 to 2.3. Note that "a" representing the molar ratio of lithium is a value immediately after the preparation of the active material and is subjected to increase and decrease during charge and discharge.

Examples of the binder and the conductive agent are similar to those exemplified for the negative electrode. Additional examples of the conductive agent include graphite, such as natural graphite and artificial graphite.

The form and the thickness of the positive electrode current collector may be respectively selected from the forms and the range corresponding to those of the negative electrode current collector. The positive electrode current collector may be made of, for example, stainless steel, aluminum, an aluminum alloy, and titanium.

[Electrolyte]

The electrolyte contains a solvent, and a lithium salt dissolved in the solvent. The concentration of the lithium salt in the electrolyte is, fix example, 0.5 to 2 mol/L. The electrolyte may certain a known additive.

The solvent may be aqueous or non-aqueous. The non-aqueous solvent may be, for example, a cyclic carbonic acid ester, a chain carbonic acid ester, or a cyclic carboxylic acid ester. Examples of the cyclic carbonic acid ester include propylene carbonate (PC) and ethylene carbonate (EC). Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvent may be used singly, or in combination of two or more lands.

Examples of the lithium salt include a lithium salt of a chlorine-containing acid (e.g., $LiClO_4$, $LiAlCl_4$, $LiB_{10}Cl_{10}$), a lithium salt of a fluorine-containing acid (e.g., $LiPF_6$, $LiBF_4$, $LiSbF_6$, $LiAsF_6$, $LiCF_3SO_3$, $LiCF_3CO_2$), a lithium salt of a fluorine-containing acid halide (e.g., LiN(CF$_3$SO$_2$)$_2$, LiN(CF$_3$SO$_2$)(C$_4$F$_9$SO$_2$), LiN(C$_2$F$_5$SO$_2$)$_2$), and a lithium halide (e.g., LiCl, LiBr, LiI). These lithium salts may be used singly or in combination of two or more kinds.

[Separator]

Usually, if is desirable to interpose a separator between the positive electrode and the negative electrode. The separator is excellent in ion permeability and has moderate mechanical strength and electrically insulating properties. The separator may be, fix example, a microporous thin film, a woven fabric, or a nonwoven fabric. The separator is preferably made of for example, polyolefin, such as polypropylene or polyethylene.

The non-aqueous electrolyte secondary battery, for example, has a structure in which an electrode group famed by winding the positive electrode and the negative electrode with the separator interposed therebetween is housed in an outer case, together with the electrolyte. The wound-type electrode group may be replaced with a different form of electrode group, for example, a stacked-type electrode group formed by stacking the positive electrode and the negative electrode with the separator interposed therebetween. The lithium ion battery may be in any form, such as cylindrical type, prismatic type, coin type, button type, or laminate type.

Figure 2:
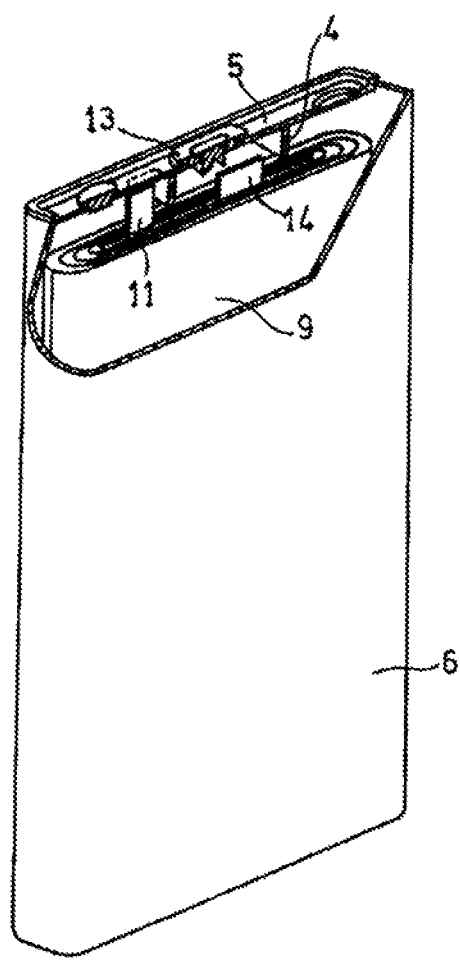
FIG. 2 A schematic partially cut-away oblique view of a lithium ion battery according to an embodiment of the present invention.

FIG. 2 is a schematic partially cut-away oblique view of a prismatic lithium ion battery according to an embodiment of the present invention.

The battery includes a bottomed prismatic battery case 6, and an electrode group 9 and an electrolyte (not shown) housed in the battery case 6. The electrode group 9 has a long negative electrode, a long positive electrode, and a separator interposed between the positive electrode and the negative electrode and preventing them from directly contacting with each other. The electrode group 9 is formed by winding the negative electrode, the positive electrode, and the separator around a flat plate-like winding core, and then removing the winding core.

A negative electrode lead 14 is attached at its one end to the negative electrode current collector of the negative electrode, by means of welding or the like. A positive electrode lead 11 is attached at its one end to the positive electrode current collector of the positive electrode, by means of welding or the like. The negative electrode lead 14 is electrically connected at its other end to a negative electrode terminal 13 disposed at a sealing plate 5. The positive electrode lead 11 is electrically connected at its other end to the battery case 6 serving as a positive electrode terminal. A resin frame member 4 is disposed on top of the electrode group 9, the frame member serving to insulate the electrode group 9 from the sealing plate 5, as well as to insulate the negative electrode lead 14 from the battery case 6. The opening of the battery case 6 is sealed with the sealing plate 5.

EXAMPLES

The present invention will be specifically described below with reference to Examples and Comparative Examples. It is to be noted, however, the present invention is not limited to the following Examples.

Example 1

[Preparation of LSX Particles]

Step (i)

Silicon dioxide was mixed with lithium carbonate such that the atomic ratio: Si/Li=1. The mixture was heated in the air at 950° C. for 10 hours, to obtain a lithium silicate represented by Li$_2$Si$_2$O$_5$. The obtained lithium silicate was pulverized to have an average particle diameter of 10 µm.

Step (ii)

The lithium silicate (Li$_2$Si$_2$O$_5$) having an average particle diameter of 10 µm was mixed with a raw material silicon (3N, average particle diameter 10 µm) in a mass ratio of 50:50. The mixture was placed in a pot (made of SUS, volume: 500 mL) of a planetary ball mill (P-5, available from Fritsch Co., Ltd.), together with 24 SUS balls (diameter: 20 mm). In the pot with the lid closed the mixture was pulverized at 200 rpm for 50 hours in an inert atmosphere. In the above, ethanol was added as an organic solvent to the mixture placed in the pot. The amount of ethanol added was 0.016 parts by mass per 100 parts by mass of the mixture of lithium silicate and raw material silicon.

Next, the powdered mixture was taken out from the pot in an inert atmosphere, which was then heated at 600° C. for 4 hours, in an inert atmosphere, with a predetermined pressure applied by a hot press, to give a sintered body of the mixture.

Step (iii)

Thereafter, the sintered body was crashed and passed through a 40-µm mesh, and then mixed with a coal pitch (MCP 250, available from JFE Chemical Corporation). The mixture was heated at 800° C. for 5 hours in an inert atmosphere, to coat composite particles with an electrically conductive carbon and thereby firm a conductive layer thereon. Tire conductive layer was formed in an amount of 5 mass %, relative to the total mass of the composite particles and the conductive layer. Thereafter, with a sieve, LSX particles (secondary particles) having an average diameter of 10 µm and including the composite particles and the conductive layer formed on tire surfaces of the composite particles were obtained

[Analysis of Composite Particles]

Across section of the LSX particles were observed under a scanning election microscope (SEM). The observation confirmed that the composite particles were composed of the secondary particles in which primary particles (average particle diameter: 3 µm) were aggregated together. The observation also confirmed that silicon particles having an average diameter of 50 nm were dispersed substantially uniformly in a matrix consisting of Li$_2$Si$_2$O$_5$. In the XRD pattern of the composite particles, diffraction peaks mainly attributed to simple Si and Li$_2$Si$_2$O$_5$ were observed. The peak intensities woe Li$_2$Si$_2$O$_5$<Si. On the other hand, no SiO$_2$ peak was observed at 2θ=25°. The composite particles were measured by Si-NMR, and the result found that the amount of SiO$_2$ in the composite particles was less than 7 mass % (less than the detection lower limit), and the area ratio of the carbon material occupying a cross section of the composite particles was 0.01%.

Using a SEM cross-sectional image of LSX particles, elemental analysts was performed by energy-dispersive X-ray spectroscopy (EDX). The result of EDX element mapping confirmed that, inside the composite particles, the carbon material was mostly present at the interlace between the adjacent primary particles, and the carbon material was also present inside the primary particles,

[Production of Negative Electrode]

The composite particles having the conductive layer were mixed with graphite in a mass ratio of 5:95, and the resultant mixture was used as a negative electrode active material. The negative electrode active material was mixed with sodium carboxymethyl cellulose (CMC-Na), styrene-butadiene robber (SBR), and polyacrylic acid lithium in a mass ratio of 96.5:1:1.5:1, to which water was added. The mixture was stirred in a mixer (T.K. HIVIS MIX, available from PRIMIX Corporation), to prepare a negative electrode slurry. Next, the negative electrode slurry was applied onto copper foil, so that the mass of a negative electrode mixture per 1 m² of the copper foil was 190 g. The applied film was dried, and then rolled, to give a negative electrode with a negative electrode mixture layer having a density of 1.5 g/cm³ formed on both sides of the copper foil

[Production of Positive Electrode]

Lithium cobalt oxide, acetylene black, and polyvinylidene fluoride were mixed in a mass ratio of 95:2.52.5. The mixture was added with N-methyl-2-pyrrolidone (NMP), and then stirred in a mixer (T.K. HIVIS MIX, available from PRIMIX Corporation), to prepare a positive electrode slurry. Next, the positive electrode slurry was applied onto aluminum foil. The applied films were dried, and then rolled, to give a positive electrode with a positive electrode mixture layer having a density of 3.6 g/cm³ on both sides of the aluminum foil.

[Preparation of Electrolyte]

In a mixed solvent containing ethylene carbonate (EC) and diethyl carbonate (DEC) in a volume ratio of 3:7, $LiPF_6$ was dissolved at concentration of 1.0 mol/L, to prepare a non-aqueous electrolyte.

[Fabrication of Lithium Ion Battery]

The positive electrode and the negative electrode, with a tab attached to each electrode, ware wound spirally with a separator interposed therebetween such that the tabs were positioned at the outermost layer, thereby to form ail electrode group. The electrode group was inserted into an outer case mate of aluminum laminate film and dried under vacuum at 105° C. for 2 hours. The non-aqueous electrolyte was injected into the case, and the opening of the outer case was sealed A lithium ion battery was thus obtained.

Comparative Example 1

A lithium ion battery was fabricated in the same manner as in Example 1, except that no ethanol was added when pulverizing in the step (ii), and no polyacrylic acid lithium was added.

Examples 2 to 9 and Comparative Examples 2 to 10

Lithium ion batteries were fabricated in the same manner as in Example 1, except that the amount of ethanol added was charged as shown in Table 1 in the step (ii), and the amount of the polyacrylic acid lithium used in the negative electrode production was changed as shown in Table 1.

The batteries of Examples and Comparative Examples were each evaluated for the following items.

[Area Ratio of Carbon Material Occupying Cross Section of Composite Particles]

The battery having been subjected to the below-described charge-discharge cycle test was disassembled, to take out the negative electrode, which was then polished with a cross section polisher (CP), to obtain a crass section of the negative electrode mixture layer. On a SEM cross-sectional image of the negative electrode mixture layer, 10 LSX particles having a maximum diameter of 5 μm or more were randomly selected, winch were then each subjected to au EDX analysis, to determine an area ratio of the carbon material occupying a cross section of the composite particle. The obtained measured values of the 10 particles were averaged. The EDX analysis was performed within 1 μm inward from the peripheral edge of the cross section of the LSX particle, so that the measurement area includes neither the conductive layer covering the composite particle nor the coating film formed on the surface of the conductive layer during charge and discharge.

[First Charge Capacity]

A constant-current charge was performed at a current of 1 It (800 mA) until the voltage reached 42 V, and then a constant-voltage charge was performed at a voltage of 4.2 V until the current reached ½₀ It (40 mA).

The charge capacity was expressed as au index number, with the charge capacity of Comparative Example 1 taken as 100. The initial capacity was judged as good when the charge capacity was 95 crime.

[Charge-Discharge Cycle Test]

Charge and discharge were repeated under the following conditions.

<Charges>

A constant-current charge was preformed at a current of 1 It (800 mA) until the voltage reached 4.2 V, and then a constant-voltage charge was performed at a voltage of 42 V until the current reached ½₀ It (40 mA).

<Discharge>

A constant-current discharge was performed at 1 It (800 mA) until the voltage reached 2.75 V.

The rest time between charge and discharge was 10 min. The ratio of the discharge capacity at the 100th cycle to the discharge capacity at the 1st cycle was defined as a cycle retention rate, and with the cycle retention rate of Example 5 taken as 100, the others were expressed as an index number.

The evaluation results are shown in Table 1.

|  | Amount of ethanol added (parts by mass) | Area ratio of carbon material occupying cross section of composite particle (%) | Polyacrylic acid lithium (parts by mass) | Cycle retention rate (index number) | First charge capacity (index number) |
|---|---|---|---|---|---|
| Com. Ex. 1 | 0 | 0 | 0 | 90 | 100 |
| Com. Ex. 2 | 0.0016 | 0.001 | 0 | 91 | 100 |
| Com. Ex. 3 | 0.005 | 0.003 | 0 | 90 | 100 |
| Com. Ex. 4 | 0.016 | 0.01 | 0 | 92 | 100 |
| Ex. 1 | " | " | 1 | 96 | 100 |
| Ex. 2 | " | " | 2 | 97 | 100 |
| Com. Ex. 5 | " | " | 3 | 90 | 100 |
| Ex. 3 | 0.1 | 0.06 | 1 | 96 | 100 |
| Ex. 4 | 0.5 | 0.3 | 1 | 98 | 100 |
| Ex. 5 | 1 | 0.6 | 1 | 100 | 100 |

-continued

|  | Amount of ethanol added (parts by mass) | Area ratio of carbon material occupying cross section of composite particle (%) | Polyacrylic acid lithium (parts by mass) | Cycle retention rate (index number) | First charge capacity (index number) |
|---|---|---|---|---|---|
| Ex. 6 | 2 | 1.19 | 1 | 100 | 100 |
| Ex. 7 | 5 | 2.98 | 1 | 99 | 99 |
| Com. Ex. 6 | 10 | 5.96 | 0 | 92 | 96 |
| Ex. 8 | " | " | 1 | 97 | 95 |
| Ex. 9 | " | " | 2 | 95 | 96 |
| Com. Ex. 7 | " | " | 3 | 92 | 95 |
| Com. Ex. 8 | 12 | 7.15 | 1 | 100 | 90 |
| Com. Ex. 9 | 16 | 9.54 | 1 | 100 | 85 |
| Com. Ex. 10 | 20 | 11.92 | 1 | 100 | 80 |

In the batteries of Examples 1 to 7, in which the carbon material was present inside the composite particles, the area ratio of the carbon material occupying a cross section of the composite particles was 0.008 to 6%, and the amount of polyacrylic acid lithium was 2 mass % or less, the first chaise capacity (initial capacity) was high, and excellent charge-discharge cycle characteristics were obtained.

In the battery of Comparative Example 1, in which no carbon material was present inside the composite particles, the batteries of Comparative Examples 2 and 3, in which the area ratio of the carbon material occupying a cross section of the composite particles was less than 0.008%, and in the batteries of Comparative Examples 4 to 7, in which the amount of polyacrylic acid lithium was zero or more than 2 mass %, cracks occurred in the particles as the charge and discharge were repeated, and the charge-discharge cycle characteristics were lowered.

In the batteries of Comparative Examples 8 to 10, in which the area ratio of the carbon material occupying a cross section of the composite particles exceeded 6%, the amount of silicon particles present inside the composite particles was reduced, resulting in a low initial capacity.

INDUSTRIAL APPLICABILITY

The present invention can provide a lithium ion battery having a high capacity and excellent chaise-discharge cycle characteristics. The lithium km battery of the present invention is useful as a main power source for mobile communication devices, portable electronic devices, and other similar devices.

REFERENCE SIGNS LIST

4: frame body
5: sealing plate
6: battery case
9: electrode group
11: positive electrode lead
13: negative electrode terminal
14: negative electrode lead
20: LSX particle
21: lithium silicate phase
22: silicon particle
23: base particle
24: primary particle
25: carbon material
26: conductive layer

The invention claimed is:

1. A lithium ion battery including a positive electrode, a negative electrode, and an electrolyte,
    the negative electrode having a current collector, and a negative electrode active material layer disposed on the current collector and containing lithium silicate particles and a binder,
    the lithium silicate particles comprising a composite structure including a lithium silicate phase and silicon particles dispersed in the lithium silicate phase, wherein a carbon material is present inside the lithium silicate particles, and an area ratio of the carbon material measured within an entire area excluding a peripheral region of 1 μm thick from a peripheral edge of a cross section of the lithium silicate particles is 0.008% to 6%, wherein the area ratio is an average of measurements of ten lithium silicate particles having a maximum diameter of 5 μm or more included in a cross-sectional image of the negative electrode mixture layer,
    the binder including at least a first resin, wherein the first resin is at least one selected from the group consisting of polyacrylic acid, a polyacrylic acid salt, and their derivatives, and
    the first resin being contained in an amount of 2 mass % or less in the negative electrode active material layer,
    wherein the lithium silicate particles include an aggregate of a plurality of primary particles including the lithium silicate phase and the silicon particles,
    the aggregate comprises a sintered body of the primary particles defining a liner, continuous interface between the primary particles, and
    the carbon material is present at at least part of the interface between the primary particles adjacent to each other, inside the aggregate.

2. The lithium ion battery of claim 1, wherein the first resin is contained in an amount of 0.2 mass % to 2 mass % in the negative electrode active material layer.

3. The lithium ion battery of claim 1, wherein the polyacrylic acid salt is a cross-linked polyacrylic acid lithium.

4. The lithium ion battery of claim 1, wherein the lithium silicate phase has a composition represented by a formula: $Li_{2x}SiO_{(2+x)}$, where $0<x<2$.

5. The lithium ion battery of claim 1, wherein the area ratio of the carbon material occupying the cross section of the lithium silicate particles is 1% to 3%.

6. The lithium ion battery of claim 1, wherein the carbon material includes at least one selected from the group consisting of a carbon compound and a carbonaceous material.

7. The lithium ion battery of claim 1, further comprising an electrically conductive material covering at least part of a surface of the aggregate, wherein
- the carbon material is present so as to extend linearly on the cross section, from an interior toward the surface of the aggregate, along the interface between the primary particles adjacent to each other, and
- an end of the carbon material on the surface side of the aggregate is in contact with the conductive material.

8. The lithium ion battery of claim 1,
- the carbon material is present at at least the part of the interface between the primary particles adjacent to each other, inside the lithium silicate phase, and between the lithium silicate phase and the silicon particles, inside the aggregate,
- wherein the carbon material is chemically bonded to, and localized on, surfaces of the primary particles, so as to linearly extend in a network configuration along the surfaces of the primary particles.

* * * * *